United States Patent Office 2,911,394
Patented Nov. 3, 1959

2,911,394

CHLOROPRENE POLYMERS CONTAINING BENZYLTHIOUREA ACCELERATORS

Lester A. Brooks, East Norwalk, and Jack C. Bacon, Noroton Heights, Conn., assignors to R. T. Vanderbilt Company, Inc., New York, N.Y., a corporation of New York No Drawing. Application June 15, 1956
Serial No. 591,518

20 Claims. (Cl. 260—79.5)

The present invention relates to the vulcanization of chloroprene polymers containing novel accelerators and especially to the vulcanization of the chloroprene polymer known as Neoprene type W.

Chloroprene polymers or neoprene are polymers of 2-chloro-1,3-butadiene (chloroprene) and copolymers of chloroprene with dienes or vinyl compounds in which chloroprene comprises the predominant monomer. These polymers or copolymers are usually made in aqueous emulsions and are available to the rubber trade under such names as GR-M, Neoprene type GN, Neoprene type GNA, Neoprene type FR, Neoprene type E, Neoprene type K, Neoprene type KNR, Neoprene type W, and Neoprene type WRT. The various types of polychloroprene or neoprene differ one from the other in the modifier used in controlling the degree of polymerization of chloroprene, typical modifiers being sulfur, sulfur dioxide, hydrogen sulfide, mercaptans, iodine compounds, and aromatic azo compounds. The chloroprene polymer which has found wide commercial acceptance because of its uniformity in molecular weight distribution and useful properties is Neoprene type W, a stabilized chloroprene polymer containing no sulfur, thiuram disulfide, or other compound capable of decomposing to liberate free sulfur or form vulcanization accelerators.

Polychloroprenes differ greatly from other synthetic rubbers and from natural rubber in the manner in which they can be vulcanized. In general, excellent vulcanizates may be obtained from polychloroprenes by incorporating certain metallic oxides, such as zinc oxide and magnesia, into the plastic chloroprene and heating to effect vulcanization. For certain applications litharge is recommended for use in place of the zinc oxide and magnesia, while in some types sulfur is recommended but is not necessary to effect vulcanization.

When a more rapid rate of cure is desired than is afforded by the metallic oxides alone, it has been the custom of the rubber trade to employ certain organic compounds as accelerators in conjunction with these metallic oxides. Thiocarbanilide or N,N'-diphenylthiourea is an example of an accelerator which has been used heretofore in the vulcanization of natural rubber, while catechol and hexamethylenetetramine are examples of previously used accelerators in the vulcanization of polychloroprene. The accelerator which has proved most effective in the vulcanization of polychloroprene, however, is ethylenethiourea. However, these accelerators as well as others all suffer from certain defects in that the vulcanizates do not have the desired properties. For example, the tensile strength of vulcanizates cured in the presence of thiocarbanilide is not as high as might be desired. In addition, accelerators such as ethylenethiourea are scorchy, i.e., they are so active at relatively low temperatures that the polychloroprene is liable to cure prematurely, or "scorch," during processing and accordingly cause economic losses. Furthermore, polychloroprene vulcanizates cured in the presence of ethylenethiourea do not have as high elongation values as is desired.

Accordingly, it is the object of the present invention to provide a novel group of accelerators for the vulcanization of chloroprene polymers and especially for the vulcanization of Neoprene type W which will impart to the vulcanizates the desired physical properties and scorch values.

The accelerators of the present invention are thiourea accelerators having the general formula

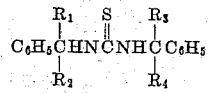

where $R_1$, $R_2$, $R_3$, and $R_4$ are radicals selected from the group consisting of hydrogen and alkyl radicals having from one to five carbon atoms. Accordingly, it will be appreciated that $R_1$, $R_2$, $R_3$, and $R_4$ may be the same or different and that the alkyl radicals may be straight or branch chain radicals. Typical examples of the accelerators include N,N'-di-alpha-methylbenzylthiourea, N,N'-dibenzylthiourea, N-alpha-methylbenzyl-N'-benzylthiourea, N-alpha-phenylpropyl-N'-alpha'-phenylamylthiourea, N-alpha - phenyl - alpha - methyl - ethyl - N' - alpha - phenyl-alpha-ethyl-propylthiourea, and N-alpha-methyl-benzyl-N'-alpha-phenyl-alpha-propyl amylthiourea.

These thiourea accelerators may be prepared by classical methods. One such method of preparation involves the reaction of a primary amine with carbon disulfide to form the amine salt which is then heated to drive off hydrogen sulfide, sometimes expedited in the presence of traces of acid. This reaction may be illustrated as follows:

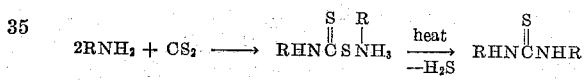

In the above equation R represents a benzyl radical or alpha-substituted benzyl radicals wherein the substituents are alkyl radicals having from one to five carbon atoms. A specific illustration of this process involving the preparation of N,N'-dibenzylthiourea is as follows:

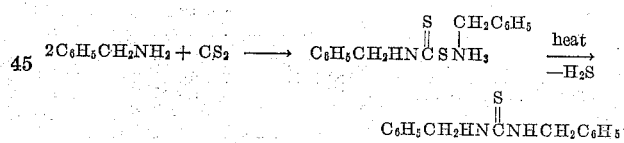

The compounds may also be prepared by the reaction of benzylamine or alpha-substituted benzylamines, with benzyl isothiocyanates, or alpha-substituted benzyl isothiocyanates, where the alpha substituents are alkyl radicals having from one to five carbon atoms. Further details as to these methods of preparation as well as others may be readily obtained by reference to the article titled "Thioureas" appearing in Chemical Reviews, volume 55, pages 181–228 (1955), by Dorothy C. Schroeder.

The amount of the thiourea accelerator which may be employed in the vulcanization of chloroprene polymers may vary within rather broad limits. In general, from about 0.05% to about 5.0% of the thiourea accelerator based on the weight of the chloroprene polymer is employed. It is preferred to use from about 0.5% to about 1.0% of the thiourea accelerator based on the weight of the chloroprene polymer present in the stock to be vulcanized.

The accelerators may be used in conjunction with the conventional ingredients used in compounding polychloroprene articles. Such ingredients include, for example, antioxidants, fillers, colors, metallic oxides, softeners, and the like.

The invention will be further illustrated by the data presented below in connection with Table I.

A typical polychloroprene, namely Neoprene type W, was compounded by milling together the ingredients in the following base formula:

| Components: | Parts by weight |
|---|---|
| Neoprene type W | 100 |
| Stearic acid | 0.5 |
| Zinc oxide | 5 |
| Extra light calcined magnesium oxide | 2 |
| Agerite Stalite | 2 |
| P-33 Black | 75 |
| Accelerator | 0.5 |

In the above formulation Agerite Stalite is a proprietary antioxidant composition composed of octylated diphenylamines and P-33 Black is a proprietary composition of fine thermal carbon black. This polychloroprene stock was vulcanized by air curing at 307° F. for varying lengths of time as shown in Table I below. After curing, the vulcanizate was tested for Mooney scorch, stress, tensile strength, elongation, and hardness. Typical thiourea accelerators of the invention were compared with heretofore known accelerators, namely thiocarbanilide and ethylenethiourea. In Table I below the accelerators designated by the numbers 1 through 3 were respectively (1) N,N'-di-alpha-methylbenzylthiourea, (2) N,N'-dibenzylthiourea, and (3) N-alpha-methylbenzyl-N'-benzylthiourea.

*Table I*

| Accelerator | 1 | 2 | 3 | Thiocarbanilide | Ethylenethiourea |
|---|---|---|---|---|---|
| Mooney Scorch at 250° F. (5 point rise) | | | | | |
| | 15 | 10 | 11 | 13 | 6 |
| Air Cure in Minutes at 307° F.: | Stress in P.s.i. at 300% Elongation | | | | |
| 10 | 1,070 | 970 | 1,140 | 1,100 | 1,390 |
| 20 | 1,170 | 1,200 | 1,300 | 1,140 | 1,665 |
| 30 | 1,220 | 1,250 | 1,300 | 1,220 | 1,770 |
| 45 | 1,220 | 1,280 | 1,360 | 1,270 | 1,865 |
| | Tensile Strength in P.s.i. | | | | |
| 10 | 2,320 | 2,310 | 2,280 | 2,310 | 2,200 |
| 20 | 2,420 | 2,440 | 2,420 | 2,310 | 2,355 |
| 30 | 2,420 | 2,500 | 2,490 | 2,380 | 2,425 |
| 45 | 2,430 | 2,530 | 2,520 | 2,380 | 2,475 |
| | Percent Elongation at Break | | | | |
| 10 | 580 | 650 | 560 | 590 | 525 |
| 20 | 570 | 610 | 540 | 560 | 455 |
| 30 | 550 | 580 | 540 | 560 | 435 |
| 45 | 550 | 570 | 520 | 530 | 420 |
| | Shore Hardness No. | | | | |
| 10 | 50 | 55 | 57 | 50 | 61 |
| 20 | 52 | 57 | 59 | 52 | 62 |
| 30 | 53 | 57 | 60 | 53 | 63 |
| 45 | 53 | 58 | 60 | 55 | 64 |

From a study of the data presented above in Table I it may be readily seen that the novel thiourea accelerators all effect a cure of a polychloroprene elastomer. The novel thiourea accelerators impart physical properties to the vulcanizates which are comparable to those imparted thereto by ethylenethiourea or superior thereto, e.g., higher elongation, and in addition the accelerators of the invention are far less scorchy than is ethylenethiourea as shown by the higher Mooney scorch values. Also, the accelerators of the invention impart to polychloroprene vulcanizates physical properties comparable to or better than those imparted to vulcanizates by thiocarbanilide. In particular, the polychloroprene vulcanizates formed in the presence of the accelerators of the invention have a higher tensile strength than do the vulcanizates containing thiocarbanilide. It will be appreciated that other accelerators of the invention may also be employed with comparable results and that the thiourea accelerators may be employed with chloroprene polymers other than Neoprene type W.

Various modifications and changes may be made in the invention herein set forth without departing from the spirit thereof and accordingly the invention is to be limited only within the scope of the appended claims.

We claim:

1. A vulcanizable polychloroprene composition comprising an unvulcanized chloroprene polymer and from about 0.05% to about 5.0% of the weight of the polymer of a thiourea compound capable of acting by itself as a vulcanization accelerator for the polymer and having the general formula

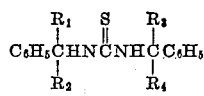

where $R_1$, $R_2$, $R_3$ and $R_4$ are radicals selected from the group consisting of hydrogen and alkyl radicals having from one to five carbon atoms.

2. A vulcanizable polychloroprene composition comprising an unvulcanized chloroprene polymer and from 0.5% to about 1.0% of the weight of the polymer of a thiourea compound capable of acting by itself as a vulcanization accelerator for the polymer and having the general formula

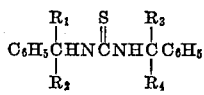

where $R_1$, $R_2$, $R_3$ and $R_4$ are radicals selected from the group consisting of hydrogen and alkyl radicals having from one to five carbon atoms.

3. A composition as set forth in claim 2 wherein the thiourea compound is N,N'-di-alpha-methylbenzylthiourea.

4. A composition as set forth in claim 2 wherein the thiourea compound is N,N'-dibenzylthiourea.

5. A composition as set forth in claim 2 wherein the thiourea compound is N-alpha-methylbenzyl-N'-benzylthiourea.

6. A vulcanizable polychloroprene composition comprising sulfur free polychloroprene and from about 0.05% to about 5.0% of the weight of the polymer of a thiourea compound capable of acting by itself as a vulcanization accelerator for the polymer and having the general formula

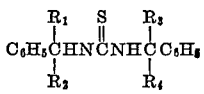

where $R_1$, $R_2$, $R_3$ and $R_4$ are radicals selected from the group consisting of hydrogen and alkyl radicals having from one to five carbon atoms.

7. A vulcanizable polychloroprene composition comprising sulfur free polychloroprene and from about 0.5% to about 1.0% of the weight of the polymer of a thiourea compound capable of acting by itself as a vulcanization accelerator for the polymer and having the general formula

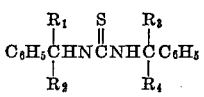

where $R_1$, $R_2$, $R_3$ and $R_4$ are radicals selected from the group consisting of hydrogen and alkyl radicals having from one to five carbon atoms.

8. A composition as set forth in claim 7 wherein the thiourea compound is N,N'-di-alpha-methylbenzylthiourea.

9. A composition as set forth in claim 7 wherein the thiourea compound is N,N'-dibenzylthiourea.

10. A composition as set forth in claim 7 wherein the thiourea compound is N-alpha-methylbenzyl-N'-benzylthiourea.

11. The process of vulcanizing chloroprene polymers comprising incorporating in a chloroprene polymer stock from about 0.05% to about 5.0% of the weight of the polymer of a thiourea compound capable of acting by itself as a vulcanization accelerator for the polymer and having the general formula

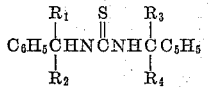

where $R_1$, $R_2$, $R_3$ and $R_4$ are radicals selected from the group consisting of hydrogen and alkyl radicals having from one to five carbon atoms, and heating at vulcanizing temperatures to cure the polymer.

12. The process of vulcanizing chloroprene polymers comprising incorporating in a chloroprene polymer stock from about 0.5% to about 1.0% of the weight of the polymer of a thiourea compound capable of acting by itself as a vulcanization accelerator for the polymer and having the general formula

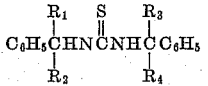

where $R_1$, $R_2$, $R_3$ and $R_4$ are radicals selected from the group consisting of hydrogen and alkyl radicals having from one to five carbon atoms, and heating at vulcanizing temperatures to cure the polymer.

13. The process as set forth in claim 12 wherein the thiourea compound is N,N'-di-alpha-methylbenzylthiourea.

14. The process as set forth in claim 12 wherein the thiourea compound is N,N'-dibenzylthiourea.

15. The process as set forth in claim 12 wherein the thiourea compound is N-alpha-methylbenzyl-N'-benzylthiourea.

16. The process of vulcanizing chloroprene polymers comprising incorporating in sulfur free polychloroprene stock from about 0.05% to about 5.0% of the weight of the polymer of a thiourea compound capable of acting by itself as a vulcanization accelerator for the polymer and having the general formula

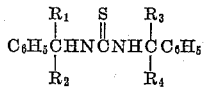

where $R_1$, $R_2$, $R_3$ and $R_4$ are radicals selected from the group consisting of hydrogen and alkyl radicals having from one to five carbon atoms, and heating at vulcanizing temperatures to cure the polymer.

17. The process of vulcanizing chloroprene polymers comprising incorporating in sulfur free polychloroprene stock from about 0.5% to about 1.0% of the weight of the polymer of a thiourea compound capable of acting by itself as a vulcanization accelerator for the polymer and having the general formula

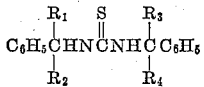

where $R_1$, $R_2$, $R_3$ and $R_4$ are radicals selected from the group consisting of hydrogen and alkyl radicals having from one to five carbon atoms, and heating at vulcanizing temperatures to cure the polymer.

18. The process as set forth in claim 17 wherein the thiourea compound is N,N'-di-alpha-methylbenzylthiourea.

19. The process as set forth in claim 17 wherein the thiourea compound is N,N'-dibenzylthiourea.

20. The process as set forth in claim 17 wherein the thiourea compound is N-alpha-methylbenzyl-N'-benzylthiourea.

References Cited in the file of this patent

UNITED STATES PATENTS

| | | |
|---|---|---|
| 2,071,966 | Bolton | Feb. 23, 1937 |
| 2,397,399 | Baird | Mar. 26, 1946 |
| 2,544,746 | Baum | Mar. 13, 1951 |
| 2,804,447 | Naylor | Aug. 27, 1957 |

OTHER REFERENCES

Dehn: J. Am. Chem. Soc., 62, 3189, 3130 (November 1940).

UNITED STATES PATENT OFFICE

CERTIFICATE OF CORRECTION

Patent No. 2,911,394                                              November 3, 1959

Lester A. Brooks et al.

It is hereby certified that error appears in the printed specification of the above numbered patent requiring correction and that the said Letters Patent should read as corrected below.

Column 6, line 44, list of references cited, under "OTHER REFERENCES", for "3130" read -- 3190 --.

Signed and sealed this 10th day of May 1960.

(SEAL)
Attest:

KARL H. AXLINE                                      ROBERT C. WATSON
Attesting Officer                                    Commissioner of Patents